United States Patent [19]
Zielinski et al.

[11] Patent Number: 5,806,864
[45] Date of Patent: Sep. 15, 1998

[54] COLLAPSIBLE CART

[75] Inventors: David J. Zielinski, Oklahoma City; William J. Bickel, Choctaw, both of Okla.

[73] Assignee: Carlisle FoodService Products, Incorporated, Oklahoma City, Okla.

[21] Appl. No.: 649,210

[22] Filed: May 17, 1996

[51] Int. Cl.⁶ ...................................................... B62B 7/06
[52] U.S. Cl. ........................................... 280/42; 280/79.3
[58] Field of Search ............................ 280/42, 651, 639, 280/79.3, 47.35

[56] References Cited

U.S. PATENT DOCUMENTS 3,436,092  4/1969  Werner ...................................... 280/651

FOREIGN PATENT DOCUMENTS 681967  2/1965  Italy ........................................ 280/42

OTHER PUBLICATIONS

Food Transport Norris Equipment Advertisement, "Fold-a-Cart", Oct. 1986.

Primary Examiner—Robert J. Oberleitner
Assistant Examiner—Pamela J. Lipka
Attorney, Agent, or Firm—McAfee & Taft

[57] ABSTRACT

A foldable or collapsible utility cart which may be alternated between a closed and an open, operable position is disclosed. The invention includes four vertical legs with a plurality of shelves mounted thereon. The shelves are rotatable relative to the legs and foldable about a middle thereof so that the cart may be alternated between the open operable position and the closed position for storage purposes. The cart is self-supporting and thus includes a stabilizing means. The stabilizing means automatically locks, or stabilizes the cart in the open position. The cart is stabilized simultaneously upon reaching the open position from the closed position.

22 Claims, 9 Drawing Sheets

COLLAPSIBLE CART

BACKGROUND OF THE INVENTION

The present invention relates generally to utility carts, and more particularly, but not by way of limitation, to a self-supporting, collapsible utility cart. Utility carts having one or more horizontal shelves are used in various industries for various purposes. For example, such carts are used in hospitals to transport food, medical supplies, medical instruments, patient belongings and other items. Likewise, such carts are used in nursing homes and restaurants to transport food, carry utensils, bus tables and for many other purposes. Such carts are commonly used in airplanes to carry foods and beverages in the aisles. The uses of such carts are virtually endless, and the uses set forth herein are not in any way limiting.

One of the difficulties with such carts is the amount of space required for storage when the carts are not in use. To resolve that problem, some utility carts have been made to collapse or fold so that less space is required for storage. One such collapsible cart is shown in FIGS. 1–4A. The prior art collapsible cart shown therein may be folded from an open operable position to a closed, or folded position requiring less storage space. However, the prior art cart has many inherent difficulties.

The cart has numerous "pinch points" which are difficult to avoid. By pinch points, it is simply meant that when the cart is being alternated between the folded and unfolded positions, the operator's hands and fingers may be pinched or squeezed at various locations. The cart is made of metal and as such is quite heavy. The weight of the cart exacerbates the pinching or squeezing problem.

In addition, the prior art cart, when moved from its collapsed, or folded position to the open position is unstable and must be held in place by the operator. The weight of the cart makes this difficult and will cause the cart to collapse to the floor if not firmly held, thus making the opening operation burdensome. In order to lock the cart in the open position, additional manual operations must be performed while the cart is held in place. Likewise, to move from the open to the closed position, the cart must be manually unlocked, moved to the closed position and locked in the closed position. During all of these operations, the cart must be firmly held, to resist the natural tendency of the hinges to rotate, thus causing the cart to collapse onto the floor.

SUMMARY OF THE INVENTION

The collapsible cart of the present invention comprises a plurality of shelves mounted to four vertical, or upstanding legs. The collapsible cart has a first end, a second end, and first and second sides. Likewise, each shelf has a first and second side, and a first and second end and also has top and bottom surfaces. The shelves are preferably comprised of plastic, and more preferably a polyethylene plastic. Thus, the cart of the present invention is much lighter than prior art metal carts.

The cart is foldable, or collapsible between an open, operable position and a closed, or collapsed position. When the cart is in the open position, the shelves are substantially horizontal and the four legs define a generally rectangular shape. Thus, when the cart is open, each shelf is generally rectangular in shape. The shelves are rotatable relative to the vertical legs and are foldable about a longitudinal dividing line so that the cart may be alternated between its open, operable position and its closed or collapsed position. Two of the vertical legs are disposed at the first end of the cart while the remaining two legs are disposed at the second end of the cart. The shelves are rotatably attached to the legs at the ends thereof.

The cart of the present invention may further include a pair of pivot rods extending longitudinally between the two ends of the cart for each shelf. The pair of pivot rods, which may comprise a first pivot rod and a second pivot rod, are connected to the vertical legs and may, in a preferred embodiment, extend through the shelves. Each shelf may be rotatably mounted to the pivot rods.

Each shelf of the plurality of shelves may be separated along the longitudinal dividing line so that each shelf may comprise a first shelf section or portion and a second shelf section or portion. The first shelf portion will rotate about the first pivot rod, while the second shelf portion will rotate about the second pivot rod as the cart alternates between its open, operable position and its closed or collapsed position. The cart has a first width when it is in its open position and a second width when it is in its closed position. The second width is substantially less than the first width, so that the cart requires less storage space when in its closed position.

The cart is self-supporting so that when it is moved from its closed to its open position, no other manual operations are required to stabilize, or lock the cart in its open position. The cart automatically holds or maintains its open position when it is moved from the closed to the open position. The cart thus may include a stabilizing means for stabilizing the cart in the open position. The stabilizing means, which may also be referred to as a locking means, stabilizes, or locks the cart in the open, operable position simultaneously with the cart being moved to the open position from the closed position. The stabilizing means may comprise a stabilizer linkage or support linkage that is operably associated with the vertical legs at each end of the cart.

Thus, one objective of the present invention is to provide a lighter collapsible cart. Another objective is to provide a collapsible cart with fewer pinch points. Another objective includes providing a collapsible cart which is self-supporting so that when the cart is moved from the closed, or collapsed position to the open position, the cart will be automatically stabilized and will require no further manual operations to lock the cart in the open position other than simply alternating the cart from the closed to the open position.

BRIEF DESCRIPTION OF THE DRAWINGS

FIG. 5 shows an end view of the present invention in the open position.

DETAILED DESCRIPTION OF A PREFERRED EMBODIMENT

Referring now to the drawings, and more particularly to FIGS. 1–4, a prior art collapsible cart is shown and generally designated by the numeral 10. Collapsible cart 10 has opposed first and second ends 15 and 20 and opposed first and second sides 25 and 30. A pair of first end legs 31 and a pair of second end legs 32 are disposed at the first and second ends, respectively, of the collapsible cart 10. Three shelves 34 extend between first and second end legs 31 and 32. The shelves are vertically spaced from one another. A side rail 36 extends between legs 31 and 32 on both sides of each shelf. A piano hinge 38 rotatably connects each shelf to the side rail at the outer edges 40 thereof. Each shelf is comprised of first and second shelf portions 42 and 44 respectively. The first and second shelf portions are connected to each other with a piano hinge 46 positioned at the bottom of each of said shelves along a dividing line 47 between the first and second shelf portion 42 and 44.

Figure 1:
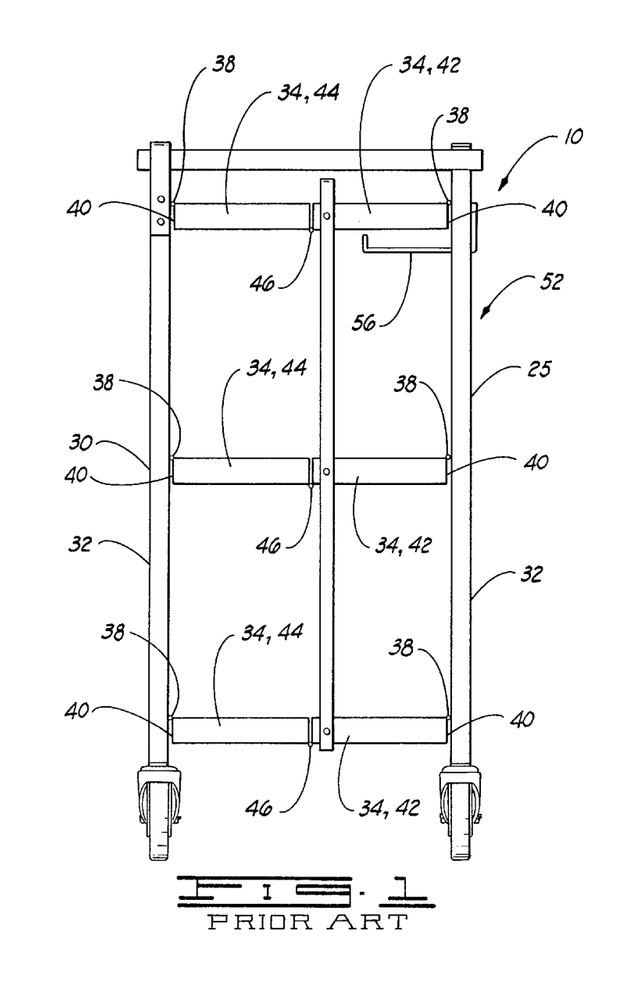
FIG. 1 shows an end view of a prior art collapsible cart in the open position.
Figure 2:
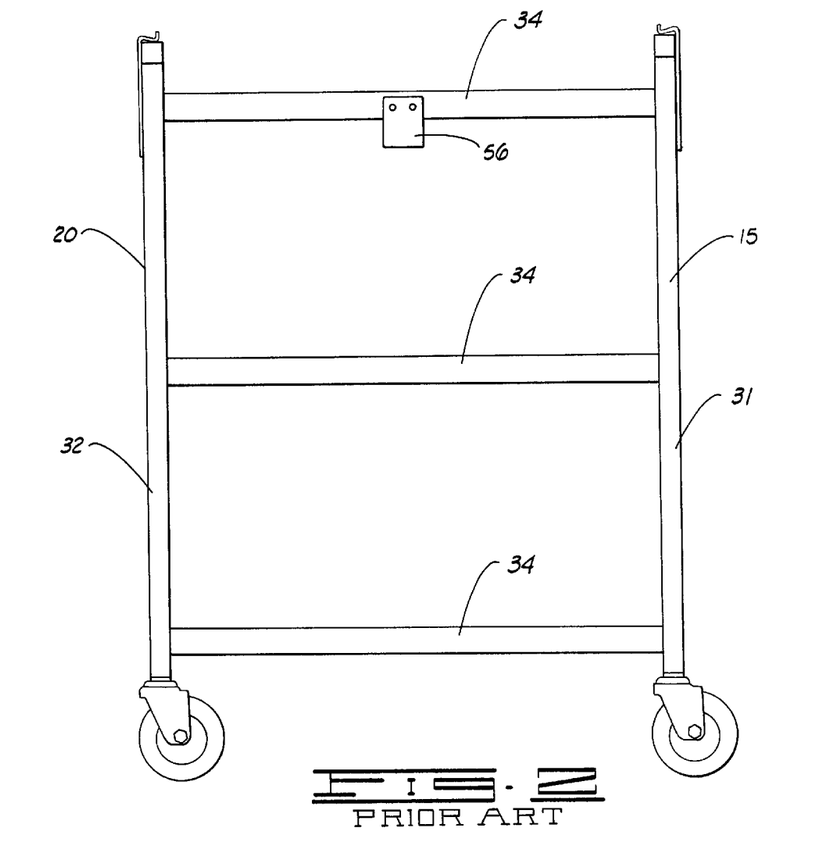
FIG. 2 shows a side view of a prior art collapsible cart in the open position with the locking arms engaged.
Figure 3:
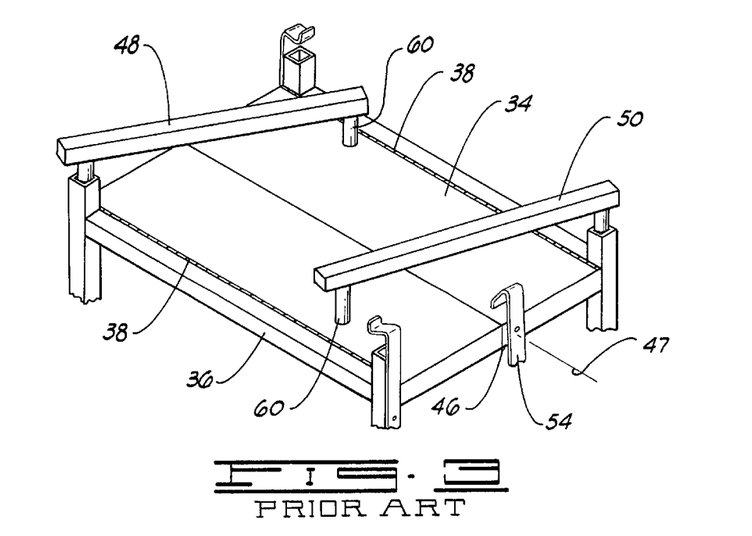
FIG. 3 shows a perspective view of a prior art collapsible cart with the locking arms disengaged.
Figure 4:
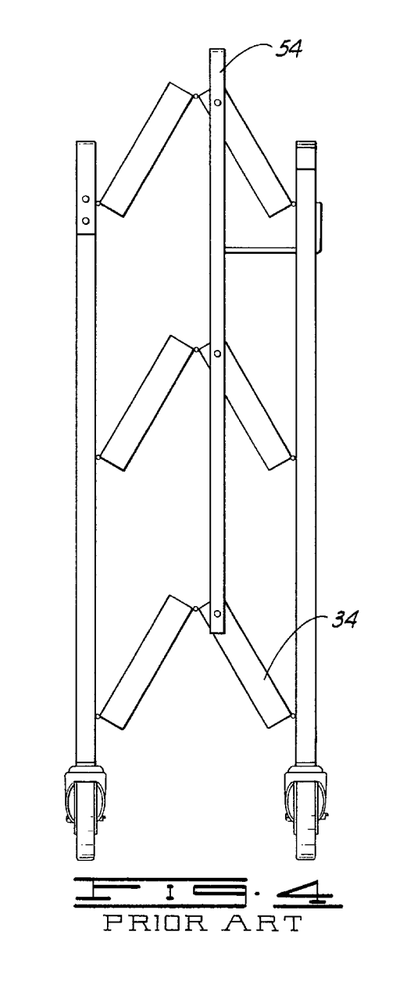
FIG. 4 shows an end view of prior art collapsible cart in a partially folded, or collapsed position.
Figure 4A:
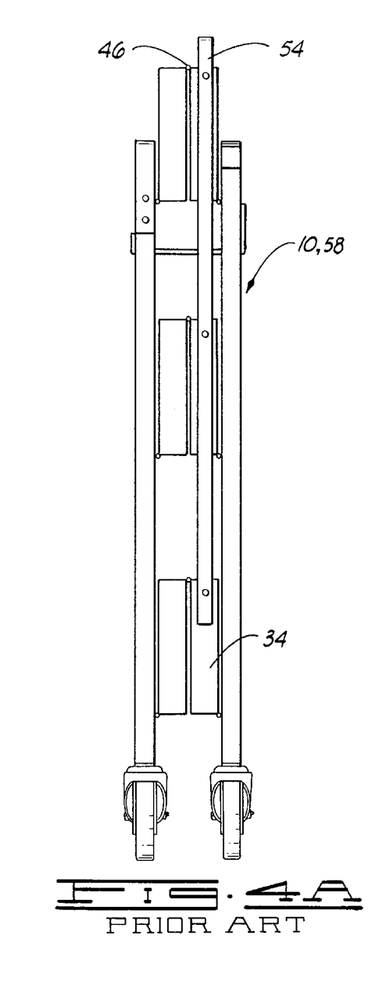
FIG. 4A shows a prior art cart in the closed position.
Figure 6:
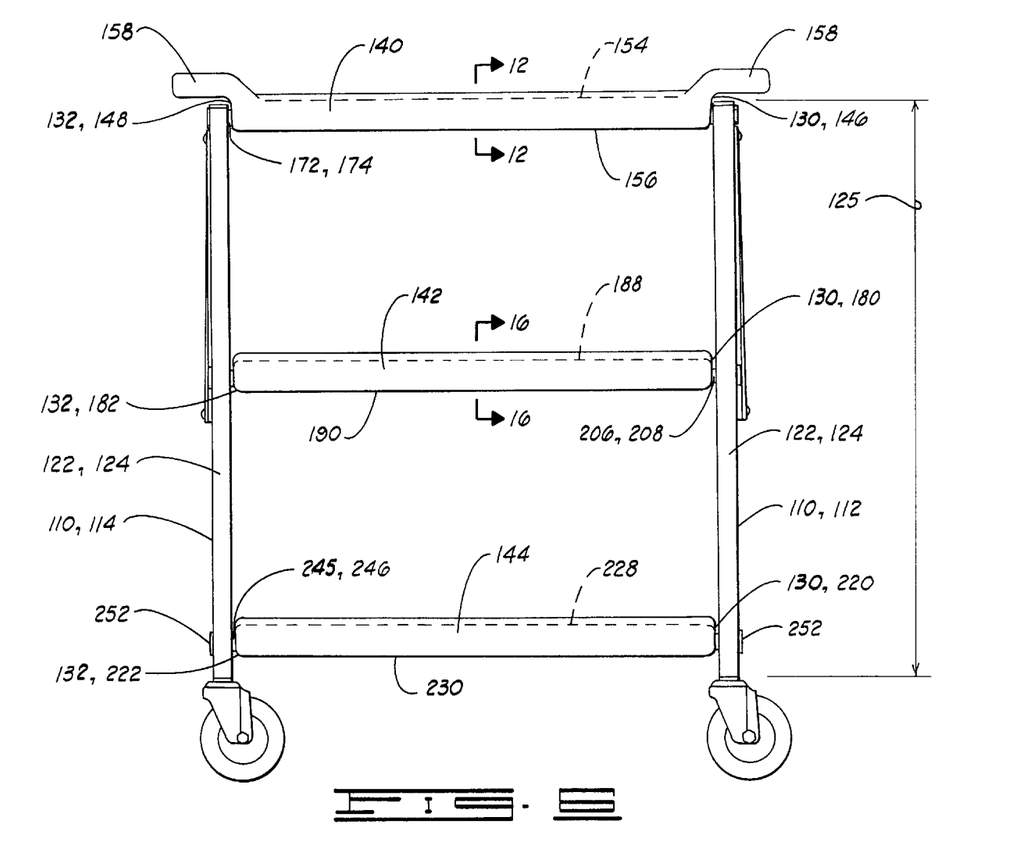
FIG. 6 shows a side view of the present invention in the open position.

Collapsible cart 10 further includes locking bars 48 and 50, respectively. FIGS. 1 and 2 show the prior art collapsible cart in its fully open position 52 with locking bars 48 and 50 in place. Locking bar 48 is positioned at one end of the cart while locking bar 50 is positioned at the opposed end. Locking bar 48 is rotatably connected to one vertical leg while locking bar 50 is rotatably connected to the leg directly diagonally across from the leg to which locking bar 48 is connected. To move the cart from its open position 52 to its closed position 58, the locking bars must be manually removed. To do so, the locking bars are moved upward and are rotated until they are parallel with the side rails. Locking bars 48 and 50 are shown removed and partially rotated in FIG. 3. As shown therein, each locking bar has a locking tube 60 extending downward at the free end thereof.

As stated above, to close the cart, the locking bars are rotated until they are parallel with the side rails. A lifting strap 54 can then be grasped and an upward load can be applied. The upward load will cause the cart to collapse inward. This operation is somewhat difficult and burdensome since both locking arms must be removed and placed in the proper closing position. The locking arms will be relatively difficult to remove since, to hold the cart in place and to make the cart stable, the locking tubes must fit securely into their corresponding vertical legs. Once the cart is in its closed position, it may be snapped in place with a snap 56 which may extend from a side rail 36.

To open the cart, snap 56 is released and the cart can be opened by applying downward pressure. Practically, the weight of the cart itself will cause the cart to open. Thus, the operator must use caution to avoid any pinching or squeezing of the fingers. Once the cart is open, the operator must securely grasp the cart to hold it in the open position while the locking arms are rotated and forced down into the corresponding vertical leg to hold the cart in place. If the cart is not held securely, or if any lateral load is applied, the hinges will rotate and the cart will collapse to the ground, since there is nothing to prevent rotation of the hinges until the locking arms are properly engaged. Thus, while the cart 10 does require less storage space than non-collapsible carts, it is difficult, burdensome and sometimes dangerous to alternate the cart between its open and its closed positions.

Figure 8:
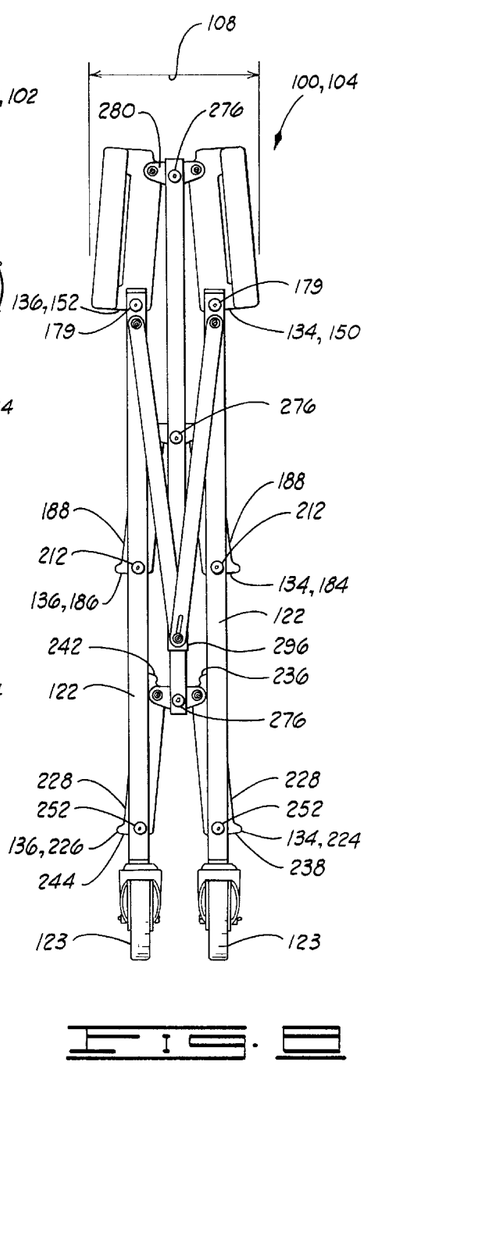
FIG. 8 shows an end view of the present invention in its closed or collapsed position.

Referring now to FIGS. 5–21, the collapsible cart of the present invention is shown and generally designated by the numeral 100. Collapsible cart 100 may be alternated between an open, operable position 102, shown in FIG. 5 and a closed, or collapsed position 104 as shown in FIG. 8. Cart 100 has a first width 106 when the cart is in open position 102 and has a second width 108 when the cart is in closed position 104. As is clear from the drawings, second width 108 is substantially less than first width 106 so that when cart 100 is in its closed or collapsed position, the amount of storage space required for the cart is greatly diminished from that which would be required if the cart were permanently fixed in its open position.

Collapsible cart 100 has a pair of opposed ends 110 which may comprise a first end 112 and a second end 114. The cart also has a pair of opposed sides 116 which may comprise a first side 118 and a second side 120. Collapsible cart 100 further comprises a plurality of upstanding, or vertical legs 122 and in the embodiment shown includes four legs 122. A wheel 123 extends downward from each leg and is connected to the leg in a manner known in the art. Legs 122 have a height 125 and may include a pair of first side legs 124 and a pair of second side legs 126. One each of first side legs 124 is located at opposed ends of cart 100 at first side 118. Likewise, one each of second side legs 126 is positioned at opposed ends of the cart at second side 120.

Cart 100 further includes a plurality of shelves 128 having a first end 130, a second end 132, a first side 134 and a second side 136. The shelves are spaced vertically from each other along the height of the legs and are rotatably mounted to the legs so that they are rotatable relative thereto. Each of the plurality of shelves 128 is foldable about a plane 138, which is shown as a line in FIG. 5. Plane 138 runs perpendicularly in and out of the paper as seen in FIG. 5. Plane 138 divides each shelf into two sides and is located at the transverse midpoint of the shelves. Thus, each shelf is foldable about the middle thereof, and about a longitudinal dividing line which is defined on plane 138. Longitudinal as used herein defines the end-to-end direction of the shelves and the cart, while lateral, or transverse defines the side-to-side direction of the shelves and the cart.

Figure 11:
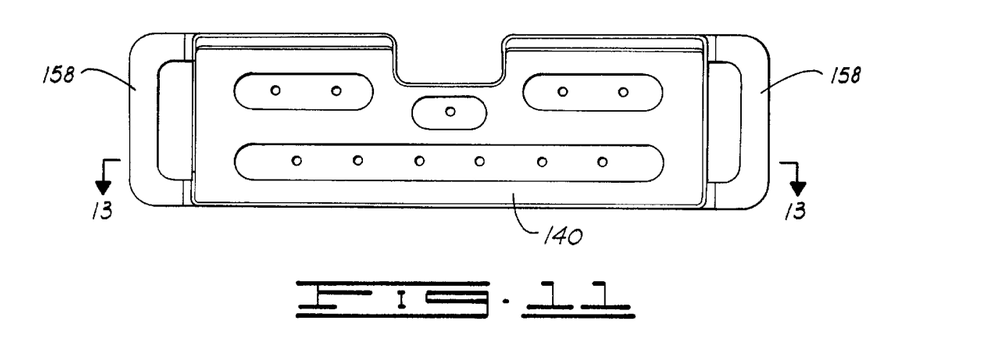
FIG. 11 shows a bottom view of a portion of the top shelf.
Figure 12:
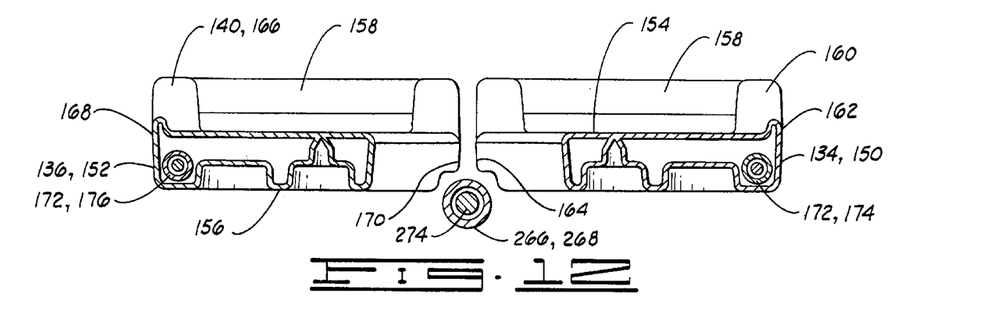
FIG. 12 is a section view taken from line 12—12 on FIG. 6.
Figure 13:
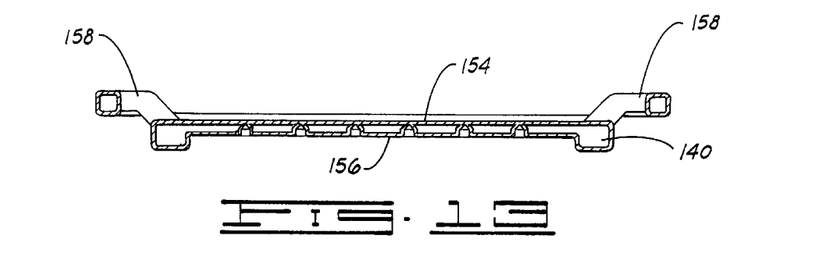
FIG. 13 is a section view taken from line 13—13 on FIG. 11.

The plurality of shelves in the embodiment shown comprises an upper shelf 140, a middle shelf 142 and a lower shelf 144. Preferably, middle and lower shelves 142 and 144 are substantially identical. Upper shelf 140 has a first end 146, a second end 148, a first side 150, a second side 152 and top and bottom surfaces 154 and 156, respectively. As shown in FIGS. 11–13, bottom surface 156 has a plurality of recesses and holes which serve to connect the bottom surface 156 to top surface 154 to provide structural integrity. Handles 158 extend upwardly and outwardly from top surface 154 of upper shelf 140 at the ends thereof.

Top shelf 140 is divided, or separated at the middle thereof along a longitudinal dividing line 159 which is defined on plane 138. Top shelf 140 is thus comprised of a first shelf portion 160 having an outer edge or side 162 and an inner edge or side 164, and a second shelf portion 166 having an outer edge or side 168 and an inner edge or side 170 which faces inner side 164 of first shelf portion 160. Top shelf 140 is thus foldable about dividing line 159 and plane 138.

Figure 9:
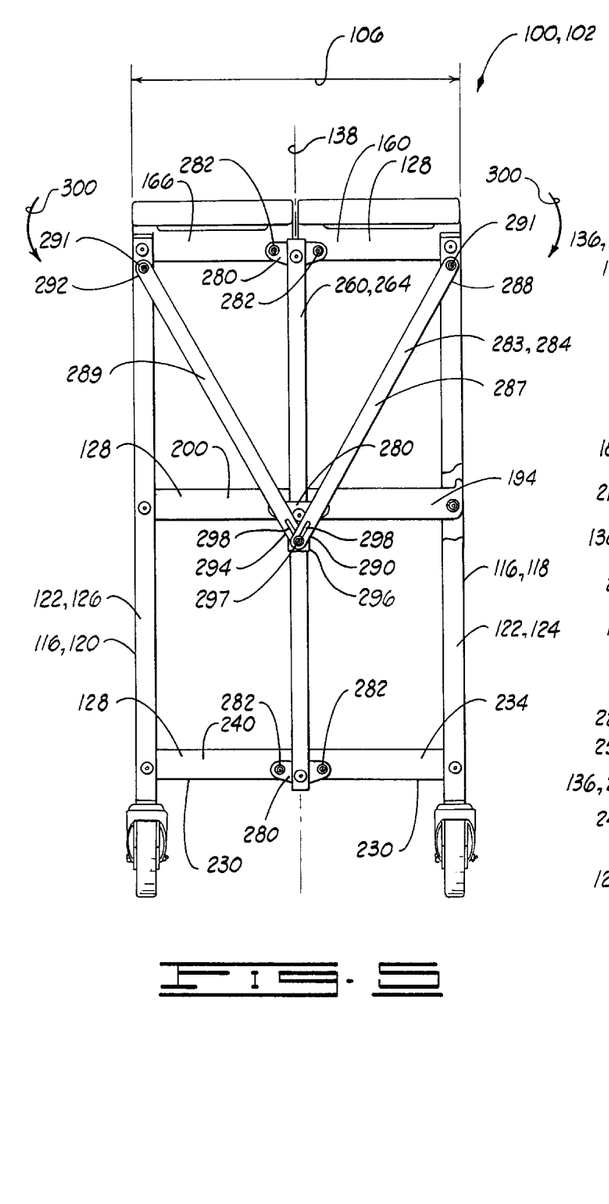
FIG. 9 is a section view taken from line 9—9 on FIG. 7.

A pair of pivot rods 172, which may comprise tubular pivot rods, extend between the pair of first side legs and second side legs 124 and 126 respectively. Pivot rods 172 may comprise a first pivot rod 174 and a second pivot rod 176. Pivot rod 174 extends between and is attached to first side legs 124. Second pivot rod 176 extends between and is attached to second legs 126. A stiffening rod 178, which is threaded at both ends, may extend longitudinally through pivot rods 174 and 176. End caps 179 having a female thread defined thereon are disposed at each end of the pivot rods and are threadedly connected to stiffening rods 178. As shown in FIG. 9, first pivot rod 174 may extend through first shelf section 160 at the outer side thereof. Likewise, second pivot rod 176 extends from end to end through second shelf section 166 at the outer side thereof. As such, first shelf portion 160 of upper shelf 140 is rotatable relative to the legs around pivot rod 172 while second shelf portion 166 is rotatable around second pivot rod 176 relative to the legs.

Figure 14:
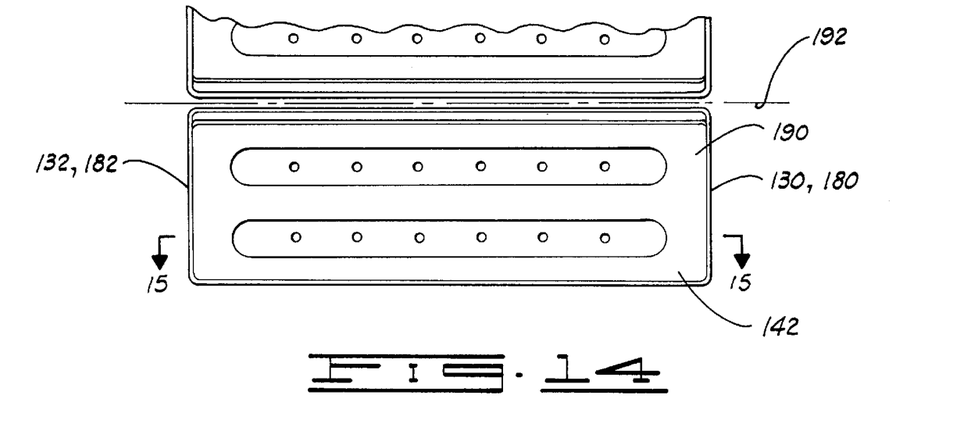
FIG. 14 shows a bottom view of a portion of the middle shelf.
Figure 15:
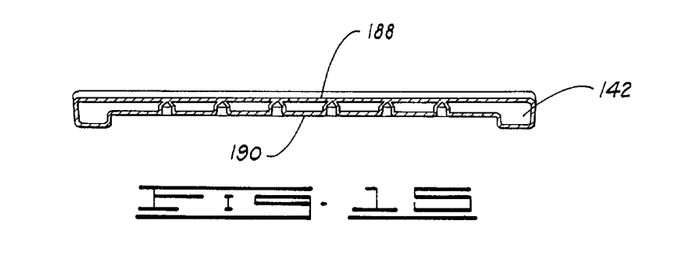
FIG. 15 is a view taken from line 15—15 on FIG. 14.
Figure 16:
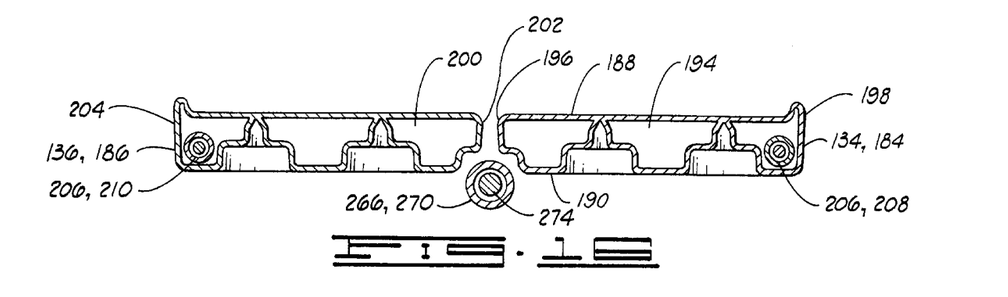
FIG. 16 is a section view taken from line 16—16 on FIG. 6.

Middle shelf 142 may include a first end 180, a second end 182, a first side 184, a second side 186, and top and bottom surfaces 188 and 190. As shown in FIGS. 14–16, the bottom surface has a plurality of recesses defined therein which connect the bottom and top surfaces thereby providing structural integrity to the shelf. Middle shelf 142 is divided or separated at the middle thereof about a longitudinal dividing line 192 which is defined on plane 138, and as such is therefore foldable about line 192 and plane 138.

Middle shelf 142 is thus separated into a first shelf portion 194 having an inner edge or side 196 and an outer edge or side 198, and a second shelf portion 200 having an inner edge or side 202 and an outer edge or side 204. A pair of pivot rods 206, which may comprise tubular pivot rods, extend longitudinally from end to end between the pair of first and second side legs and are attached thereto. Pivot rods 206 may comprise a first pivot rod 208 and a second pivot rod 210. As shown in FIG. 9, a threaded stiffening rod 211 may extend through tubular pivot rods 208 and 210. Threaded end caps 212 engage the ends of stiffening rods 211. First pivot rod 208 may extend through first shelf portion 194 at the outer side thereof, and second pivot rod 210 may extend through second shelf section 200 of the outer side thereof. First shelf section 194 is thus rotatable relative to the legs about pivot rod 208 and second shelf section 200 is rotatable relative to the legs about second pivot rod 210.

Lower shelf 144 may comprise a first end 220, a second end 222, a first side 224, a second side 226 and top and bottom surfaces 228 and 230. As set forth herein, bottom shelf 144 is preferably substantially identical to middle shelf 142 and therefore will have a plurality of recesses on the bottom surface thereof which increase the structural integrity thereof. Bottom shelf 144 is separated at the middle thereof about a longitudinal dividing line 232 which rests on plane 138. Lower shelf 144 thus comprises a first shelf portion 234 having an inner side or edge 236 and an outer edge or side 238, and a second shelf portion 240 having an inner side or edge 242 and an outer side or edge 244. Lower shelf 144 is thus foldable about line 232 and plane 138.

Figures 17, 18, 19:
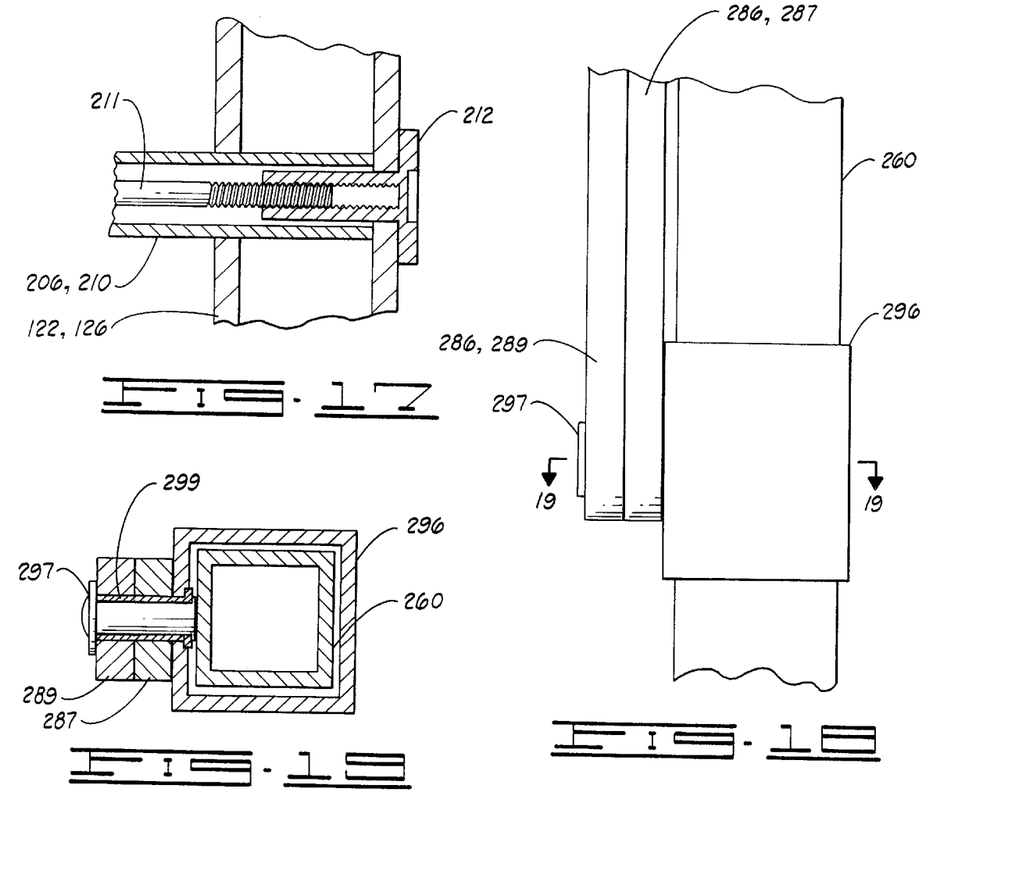
FIG. 17 is a partial section view showing the connection of the pivot rods to the legs.
FIG. 18 shows a slider block and a vertical stabilizer.
FIG. 19 is a view taken from line 19—19 on FIG. 18.
Figure 20:
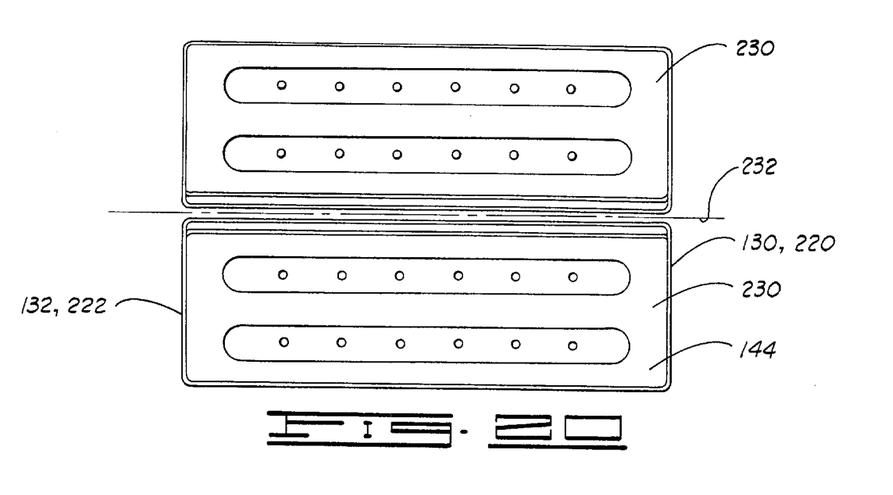
FIG. 20 shows a bottom view of the lower shelf.

Lower shelf 144 is rotatable relative to the legs about a pair of pivot rods 245, which may comprise tubular pivot rods. Pivot rods 245 may comprise a first pivot rod 246 and a second pivot rod 248. First and second pivot rods 246 and 248 extend longitudinally between the pair of first side legs 124 and second side legs 126 respectively. First pivot rod 246 extends through first shelf portion 234 at the outer side 238 thereof while second pivot rod 248 extends through second shelf portion 240 at the outer side 244 thereof. Thus, first shelf section 234 is rotatable about first pivot rod 246 and second shelf section 240 is rotatable about second pivot rod 248 so that the bottom shelf is rotatable relative to the legs. A threaded stiffening rod 250 may extend longitudinally through pivot rods 246 and 248. A pair of threaded end caps 252 threadedly engage the ends of stiffening rod 250. As shown herein, pivot rods 174, 176, 208, 210, 246 and 248 are substantially identical. Each of pivot rods may extend through legs 122 as shown in FIG. 9. FIG. 17 shows an enlarged view of the end connection of a pivot rod to a vertical leg. The view therein shows the connection of pivot rod 210, which extends through middle shelf 144, to a leg 122. The connection shown therein is typical of the end connections for all of the pivot rods. Because each shelf of the plurality of shelves is rotatable about the pivot rods and foldable about a longitudinal dividing line, the collapsible cart is foldable, or collapsible and may be easily alternated between the open position 102 and the closed position 104.

A pair of vertical stabilizer bars 260 is also included. Vertical stabilizer bars 260 may be comprised of square or rectangular-shaped tubing and may include a first stabilizer bar 262 disposed at first end 130 of the shelves and a second substantially identical stabilizer bar 264 disposed at second end 132. The vertical stabilizer bars are positioned between the legs at each end of the cart, and are located at the middle of the shelves where the shelves are separated. A plurality of connecting bars 266 extend longitudinally between, and are connected to, vertical stabilizer bars 262 and 264. The embodiment shown includes three connector bars, one at each shelf location, which may comprise upper, middle and lower connecting bars 268, 270 and 272, respectively. The upper, middle and lower connecting bars may be substantially identical.

Figure 10:
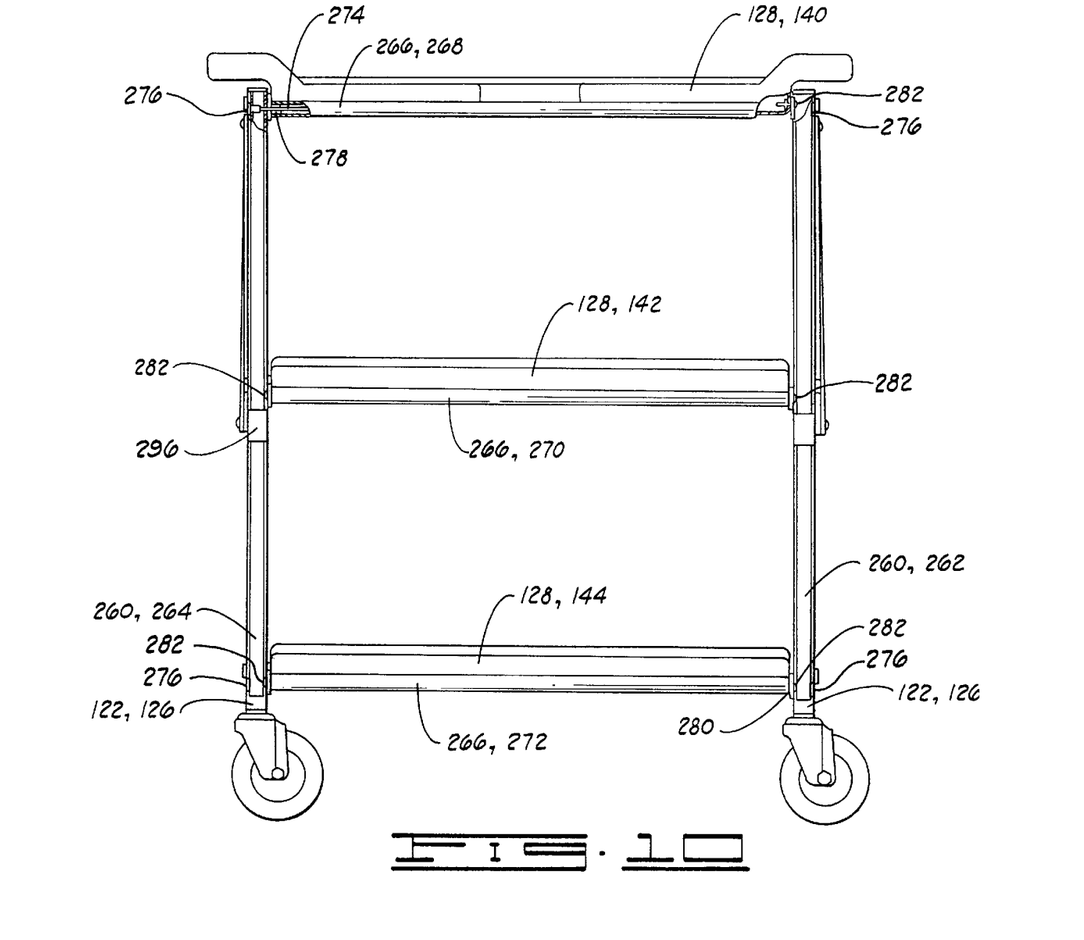
FIG. 10 is a view taken from line 10—10 on FIG. 7.
Figure 21:
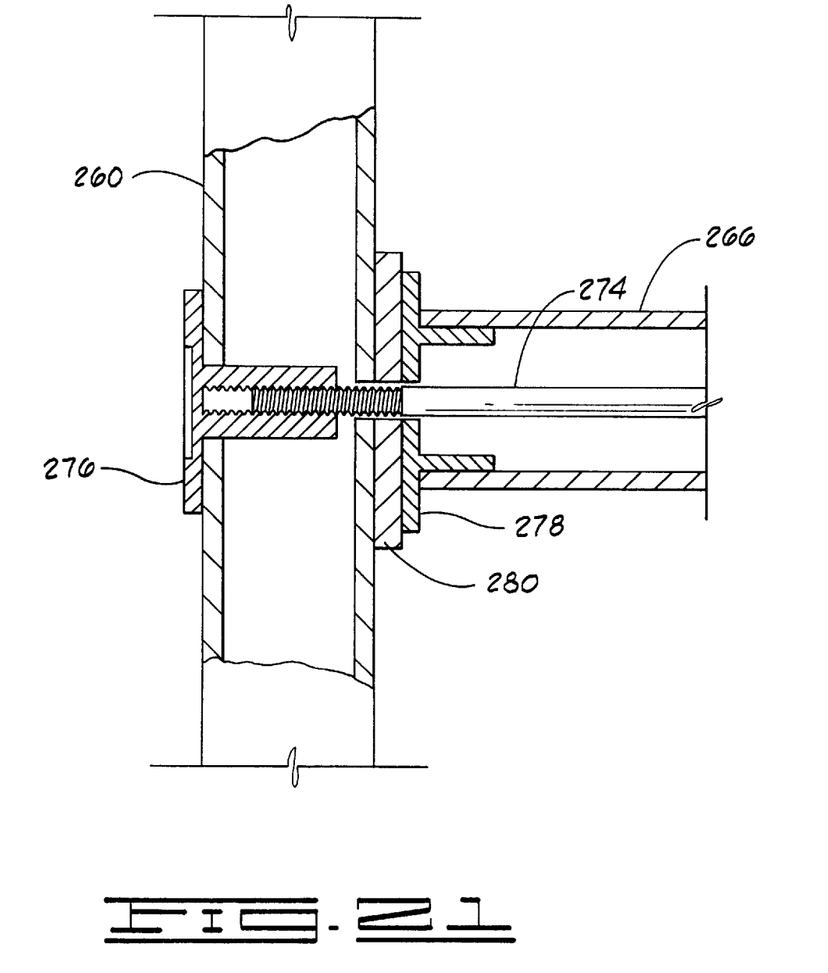
FIG. 21 is a section view showing the attachment of a connecting bar to a vertical stabilizer.

As shown in FIG. 10 and more clearly in FIG. 21, a threaded stiffening rod 274 extends longitudinally through each connecting bar. A threaded end cap 276 is included at each end of each connecting bar 266 to threadedly engage stiffening rods 274. A centralizer 278 may be disposed at each end of the connecting bars to centralize threaded stiffener 276 within the tubular connecting bars. As shown in FIGS. 5 and 12, upper, middle and lower connecting bars 268, 270 and 272, respectively, are disposed between the first and second shelf portions of the upper, middle and lower shelves, respectively.

A butterfly clip 280 is disposed at both ends of each connecting bar 266. The butterfly clip extends toward the sides of the shelves in both directions from the connecting bar. A butterfly clip 280 is pivotally connected to each shelf at both ends thereof, near the inner side of the first and second shelf portions. Thus, the first and second shelf sections of each shelf are rotatable relative to the butterfly clip and to the vertical stabilizer bar. Each butterfly clip may be pivotally connected with a pivot pin 282 which extends through the butterfly clip and into the first and second shelf portions at both ends of each of the shelves. Pivot pins 282 may comprise rivets.

Figure 7:
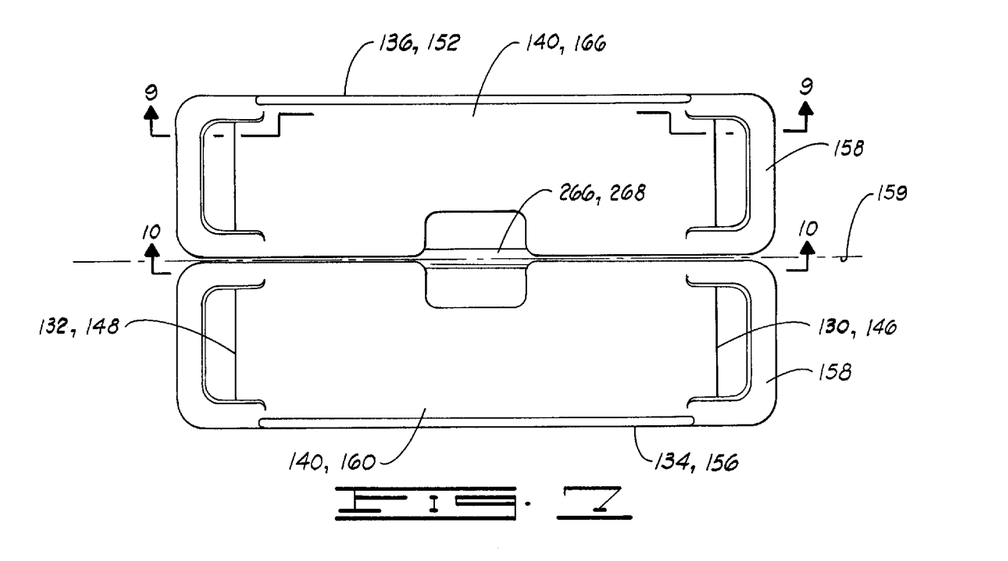
FIG. 7 shows a top view of the present invention in the open position.

As shown and described, the collapsible cart of the present invention may be easily alternated between open position 102 having first width 106 and closed position 104 having second width 108 of substantially less magnitude than first width 106. To move the cart from the open position 102 to the closed or collapsed position 104, one can simply grasp upper connecting bar 268, which as shown in FIG. 7 is accessible at the top of the cart, and pull upward. This will cause the cart to collapse to its closed position. Alternatively, the handles on the top shelf may be grasped and rotated downward and inward, as designated by arrows 300 in FIG. 5, which will also cause the cart to collapse. As the legs move inward and the cart collapses, the first and second shelf sections of each shelf will rotate about their corresponding pivot rods. The inner side of each shelf section will rotate about pivot pins 282 and will travel vertically upward. Likewise, when alternated from the collapsed to the open, operable position, the inner side of the first and second shelf sections will travel vertically downward as the first and second shelf sections of each shelf rotate about pivot pins 282 and their corresponding pivot rods.

The collapsible cart of the present invention is also self-supporting. Cart 100 automatically stabilizes, or locks itself in open position 102 upon be to open position 102 from closed position 104. The cart is stabilized simultaneously with the cart reaching its open position 104. Thus, the cart includes a locking or stabilizing means 283.

Locking or stabilizing means 283 comprises a support linkage 284 disposed at at least one end of the cart. Preferably, a support linkage 284 is disposed at each end of the cart. Support linkage 284 comprises a pair of substantially identical links 286 which may comprise a first link 287 and second link 289. First link 287 has first and second ends 288 and 290, respectively. Second link 289 has first and second ends 292 and 294 respectively. First end 280 of link 287 is rotatably attached to the first side leg while first end 292 of second link 289 is rotatably attached to the second side leg at the same end of the cart. The links may be rotatably attached to the legs with rivets 291, or by other means known in the art. Second ends 290 and 294 of first and second links respectively are rotatably attached to a slider block 296 with a rivet 297 or other means known in the art. As shown in FIG. 19, an insert 299 extends through slider block 296 and links 286. The insert may have a press, or interference fit in slider block 296 and is received in the links 286. The insert allows for freer rotation and relative movement of links 286.

As best seen in FIGS. 18 and 19, slider block 296 is slidably disposed about each vertical stabilizer bar 260. The slider block 296 is positioned between the second and third connecting bars. Links 287 and 289 may have slots 298 defined therein at the lower ends thereof so that the second ends thereof are rotatably and slidably connected to the slider block. The slots may be necessary to allow the cart to fully close, depending on the size of the cart. For instance, as shown in FIG. 8, slider block 296 and lower connecting bar 272 are separated when cart 100 is in the fully closed position. For larger carts, the relative vertical travel between the slider block and the vertical stabilizer bar that is required to allow full closure may be such that block 296 and bar 272 would interfere. Slots 298 would allow full closure in such a case by allowing relative movement between rivet 297 and links 287 and 289.

As is obvious from the drawings, when the cart is moved from the closed to the open position, the vertical stabilizer bars will slide downward relative to sliding blocks 296 as the shelves rotate. When the cart reaches its fully open position as shown in FIG. 5, it will automatically be stabilized or locked therein. No additional movement or locking operation is required to stabilize the cart. When weight is applied downward, and/or to the left or right, additional rotation is prevented by the support linkage, so that the cart will not have a tendency to fold or to shift to the left or right. This feature provides a great improvement over prior art carts which, as previously described, must be manually locked into place with locking arms. Until the locking arms of prior art carts are moved into place, the carts are unstable and have a tendency to move to the left or right as viewed in FIG. 1. The weight of the cart itself will cause the cart to shift to the right or left and it will collapse downward. In other words, until the locking arms are engaged, the hinges can freely rotate, and the cart will attempt to turn itself into a parallelogram shape and fall to the floor.

The cart of the present invention also represents an improvement in that when it is desired to move from the open to the closed position, one need simply pull vertically upward on the top connecting bar or rotate the handles down and in. With prior art carts, it was required that locking arms be disengaged, and moved into a proper position prior to folding the cart.

It has been shown that the collapsible cart of the present invention provides distinct advantages over the prior art. It is understood that the foregoing description of the invention and illustrative drawings which accompany the same are presented by way of explanation only and that changes may be made by those skilled in the art without departing from the true spirit of the invention. Accordingly, any and all modifications, variations or equivalent apparatus or methods which may occur to those skilled in the art should be considered to be within the scope of the invention as defined by the appended claims.

What is claimed is:

1. A foldable utility cart comprising:
   four vertical legs, said legs being positioned to define a generally rectangular shape when said cart is in an open, operable position;
   a plurality of shelves mounted on said legs, said shelves being vertically spaced along a height of said legs, each of said shelves being foldable about the middle thereof and being rotatable relative to said legs, wherein said cart may be alternated between said operable, open position, and a collapsed position, said shelves having first and second ends and first and second sides, wherein said four vertical legs comprise two legs positioned at said first end and two legs positioned at said second end;
   a plurality of pivot rods extending from said legs at said first end to said legs at said second end, wherein said shelves rotate about said pivot rods when said shelf is alternated between its open and collapsed positions; and
   said cart being self-supporting so that said cart is automatically stabilized and will automatically maintain its open position when alternated from said collapsed position to said open position.

2. The utility cart of claim 1 wherein each of said shelves is separated at said middle thereof, each said shelf being comprised of two separate shelf portions, said shelf portions comprising a first shelf portion and second shelf portion, said first and second shelf portions having an outer side and an inner side, wherein said pivot rods extend through said first and second shelf portions at said outer sides.

3. The utility cart of claim 1, said cart having a first width when said cart is in said open position and a second width when said cart is in said collapsed position, said second width being substantially less than said first width.

4. The cart of claim 1 further comprising a stabilizing means operably associated with said legs, wherein said stabilizing means automatically stabilizes said cart in said open position when said cart is alternated from said collapsed to said open position.

5. The cart of claim 4 further comprising a vertical stabilizer bar located at each end of said cart, said stabilizer bars being positioned at said middle of said shelves, wherein said stabilizer means comprises a support linkage located at at least one end of said cart, said support linkage comprising:

a first link having first and second ends, said first end of said first link being rotatably connected to one of said legs at said at least one end and said second end of said first link being rotatably connected to a sliding block slidably disposed about said vertical stabilizer bar; and a second link having first and second ends, said first end of said second link being rotatably connected to the other of said legs at said at least one end of said cart, and said second end of said first link being rotatably connected to said sliding block.

6. The cart of claim 5 further comprising two said support linkages, one each located at opposed ends of said cart.

7. The cart of claim 1, further comprising a wheel extending downward from each of said legs.

8. A folding utility cart comprising:

a plurality of vertically spaced shelves having first and second ends and first and second sides;

a pair of first side legs, one each of said first side legs being positioned at said first and second ends of said shelves at said first side thereof, said shelves being mounted to and rotatable relative to said first side legs;

a pair of second side legs, one each of said second side legs being positioned at said first and second ends of said shelves at said second side thereof, said shelves being mounted to and rotatable relative to said second side legs, each of said shelves being foldable about a middle thereof so that said cart is foldable between an open, operable position and a closed position;

a plurality of first pivot rods extending from said first side leg at said first end to said first side leg at said second end, each shelf being rotatably mounted to one of said plurality of said first pivot rods;

a plurality of second pivot rods extending from said second side leg at said first end to said second side leg at said second end, each shelf being rotatably mounted to one of said plurality of said second pivot rods; and stabilizing means for stabilizing said cart in said open position, wherein said stabilizing means stabilizes said cart in said open, operable position simultaneously with said cart being moved to said open position from said closed position.

9. The cart of claim 8 wherein said stabilizing means comprises a support linkage disposed at at least one end of said cart, said support linkage being operably associated with said legs at said at least one end of said cart to resist rotation of said shelves relative to said legs when said cart is in said open position.

10. The cart of claim 9 wherein said stabilizing means comprises one each of said support linkages disposed at each end of said cart.

11. The cart of claim 9 further comprising a first vertical stabilizer bar disposed at said at least one end of said cart, said vertical stabilizer bar being positioned at said middle of said shelves, wherein said support linkage is comprised of:

a first link having first and second ends, said first end of said first link being rotatably connected to said first side leg at said at least one end and said second end of said first link being rotatably connected to a slider block disposed about said vertical stabilizer; and a second link having first and second ends, said first end of said second link being rotatably connected to said second side leg at said at least one end, and said second end being rotatably connected to said slider block.

12. The cart of claim 11 further comprising a second vertical stabilizer bar positioned at the opposed end of said cart, said cart including one each of said support linkages at said first and second ends of said cart.

13. The cart of claim 8 wherein said plurality of shelves comprises a top shelf, a middle shelf and a bottom shelf.

14. The cart of claim 8 wherein each shelf of said plurality of shelves is comprised of a first shelf portion and a second shelf portion, said first and second shelf portions being separated from each other at said middle of said shelf, said first and second shelf portions having an inner edge and an outer edge.

15. The cart of claim 14, further comprising:

a first vertical stabilizer disposed at said first end of shelves; and a second vertical stabilizer positioned at said second end of said shelves;

said vertical stabilizers being positioned at said middle of said shelves and having a pair of pivot pins extending therefrom at each shelf location, wherein one of said pivot pins extends into said first shelf portion and the other of said pivot pins extends into said second shelf portion.

16. The cart of claim 15 wherein:

said first and second portions of said shelves are rotatably attached to said first and second pivot rods respectively, and wherein said first and second portions rotate in opposite directions when said cart is moved from one of said open or closed positions to the other of said open or closed positions.

17. The cart of claim 15 wherein said first and second portions rotate about said pivot pins simultaneously with said rotation of said shelves relative to said legs.

18. The cart of claim 14 wherein said first and second shelf portions are substantially horizontal when said cart is in said open position, and wherein said inner edges of said shelf portions travel upwardly as said cart is moved from said open position to said closed position, thereby decreasing a width of said cart from a first width to a second width, said second width being substantially less than said first width.

19. The cart of claim 8 further comprising a wheel extending from the lower end of each of said legs.

20. A folding utility cart comprising:

a plurality of vertically spaced shelves having first and second ends and first and second sides wherein each shelf of said plurality of shelves is comprised of a first shelf portion and a second shelf portion, said first and second shelf portions being separated from each other at a middle of said shelf;

a pair of first side legs, one each of said first side legs being positioned at said first and second ends of said shelves at said first side thereof, said shelves being mounted to and rotatable relative to said first side legs;

a pair of second side legs, one each of said second side legs being positioned at said first and second ends of said shelves at said second side thereof, said shelves being mounted to and rotatable relative to said second side legs, each of said shelves being foldable about said middle thereof so that said cart is foldable between an open, operable position and a closed position;

a first vertical stabilizer disposed at said first end of shelves;

a second vertical stabilizer positioned at said second end of said shelves, said vertical stabilizers being positioned at said middle of said shelves and having a pair of pivot pins extending therefrom at each shelf location, wherein one of said pivot pins extends into said first shelf portion and the other of said pivot pins extends into said second shelf portions;

first pivot rods extending between said first side legs; and second pivot rods extending between said second side legs, said first and second portions of said shelves being rotatable about said pivot pins and said pivot rods when said cart is moved from one of said open or closed positions to the other of said open or closed positions.

21. The cart of claim 20 further comprising:

first pivot rods extending between said first side legs;

second pivot rods extending between said second side legs, said first and second portions of said shelves being rotatably attached to said first and second pivot rods respectively, wherein said first and second portions rotate in opposite directions when said cart is moved from one of said open or closed positions to the other of said open or closed positions.

22. The cart of claim 20 wherein said first and second portions rotate about said pivot pins simultaneously with said rotation of said shelves relative to said legs.

* * * * *

UNITED STATES PATENT AND TRADEMARK OFFICE
CERTIFICATE OF CORRECTION

PATENT NO. : 5,806,864
DATED : September 15, 1998
INVENTOR(S) : David J. Zielinski and William J. Bickel It is certified that error appears in the above-identified patent and that said Letters Patent is hereby corrected as shown below:

Column 7, line 22, delete "be" and insert --being moved-- therefor.

Column 11, line 11, "portions" should be singular.

Signed and Sealed this

Second Day of February, 1999

Attest:

Attesting Officer

Acting Commissioner of Patents and Trademarks